United States Patent Office 3,466,519
Patented Sept. 9, 1969

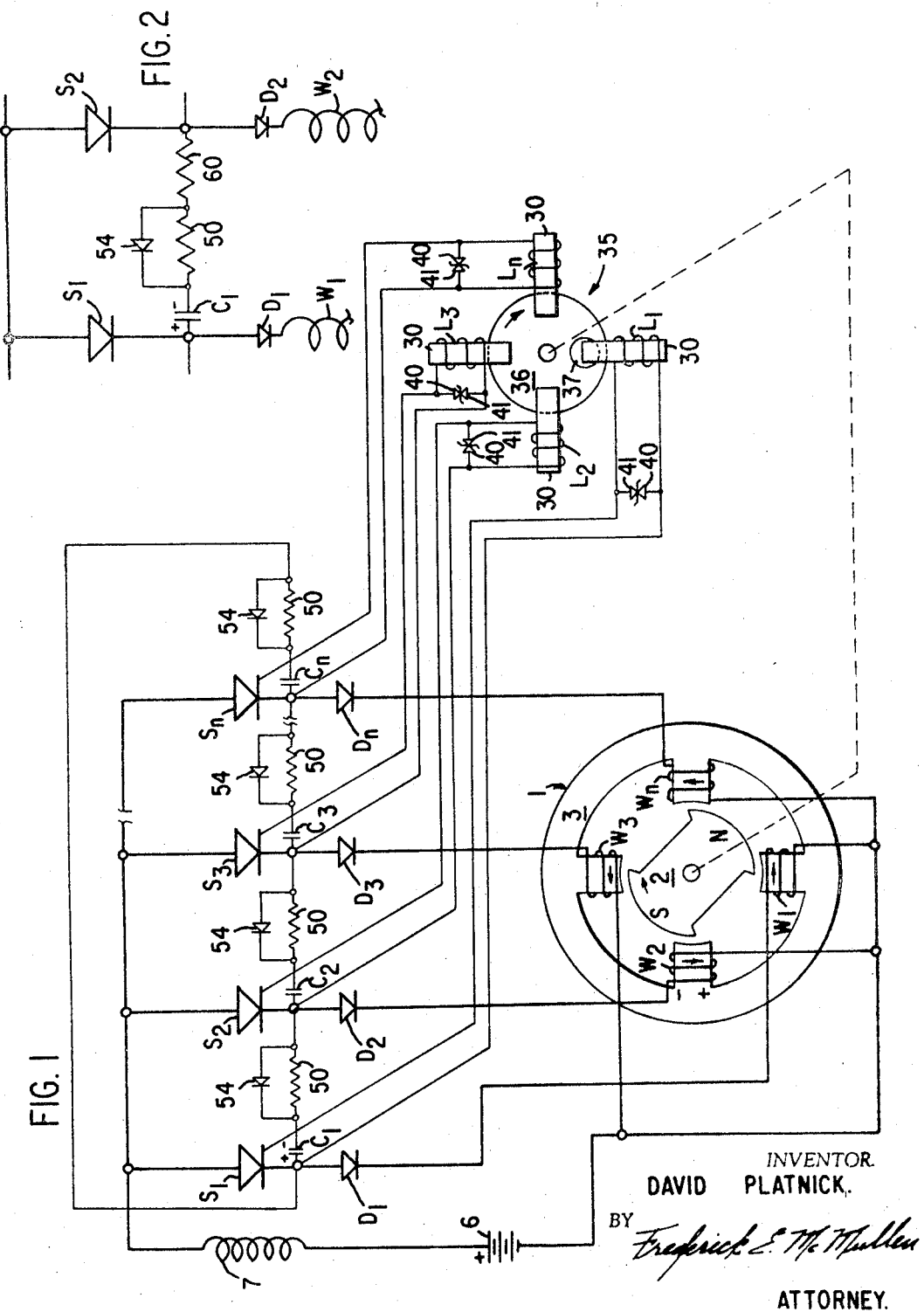

3,466,519
DIRECT CURRENT MOTOR EMPLOYING A STATIC SWITCHING ARRANGEMENT
David Platnick, Hamilton, Ontario, Canada, assignor to Carrier Corporation, Syracuse, N.Y., a corporation of Delaware
Filed Oct. 24, 1966, Ser. No. 588,842
Int. Cl. H02k 29/02
U.S. Cl. 318—138         4 Claims

ABSTRACT OF THE DISCLOSURE

Direct current motor employing a static switching arrangement operable in a predetermined order to energize the windings including a capacitor and a resistance to limit the charge on the capacitor and prevent excess current surge.

---

This invention relates to dynamoelectric machines, and more particularly, to a motor intended for operation on direct current.

In dynamoelectric machines such as direct current motors of the type employing a static switching arrangement is place of the more conventional brush and commutator system, the switching devices, which may for example be silicon-controlled rectifiers, are made operative in a determined order to energize the motor windings and operate the motor. To effect the necessary turn-off of each switching device, a capacitor based potential is reversely applied to the conducting switching device to reduce the current flow therethrough to a point where the switching device becomes inoperative. During operation of the motor however, a voltage is induced in the motor windings including the "off" windings by the moving motor rotor. Where the polarity of the voltage induced in one or more of the "off" windings is the same as that of the power source, the voltage stored by the turn-off capacitors is larger than the voltage of the power source, and on discharge of the turn-off capacitors, the ensuing surge of current may damage or destroy the circuit components.

It is a principal object of the present invention to provide an improved operating arrangement for dynamoelectric machines.

It is a further object of the present invention to provide a new and improved static switching arrangement for a dynamoelectric machine having means to regulate the voltage build-up on the turn-off capacitors.

It is an object of the present invention to provide, in a solid state commutated motor, means to limit both the charge rate and the discharge rate of the control capacitors.

This invention relates to a motor having a stator with plural energizing windings and a rotor movable in response to energization of the windings having in combination first circuit means for energizing one of the windings, the first circuit means including a switching device with a diode series connected between the switching device and the one winding; second circuit means for energizing a second one of the windings, the second circuit means including a switching device with a diode series connected between the switching device and the second winding; means for rendering the first circuit means switching device inoperative to deenergize the one winding including third circuit means connected with the first and second circuit means between the switching devices and the diodes, the third circuit means including a capacitor chargeable upon actuation of the first circuit means switching device, actuation of the second circuit means switching device to energize the second winding discharging the capacitor through the first circuit means switching device to render the first circuit means switching device inoperative and deenergize the one winding; and means controlling the rate of change of current in the third circuit means to limit the charge on the capacitor and prevent excess current surge in the second circuit means upon discharge of the capacitor.

Other objects will be apparent from the ensuing description and drawings in which:

FIGURE 1 is a schematic diagram showing a circuit arrangement for dynamoelectric machines according to this invention; and FIGURE 2 is a schematic diagram showing a modified circuit arrangement for dynamoelectric machines according to this invention.

Referring to FIGURE 1 of the drawings, there is shown a motor 1 having a relatively rotatable rotor 2 and stator 3 inductively coupled one to the other. For exemplary purposes rotor 2 is illustrated as a permanently magnetized member having north-south poles. However, rotor 2 may comprise a wound rotor energized from a suitable source. Stator 3 is provided with a plurality of windings, $W_1$, $W_2$, $W_3$, $W_n$ effective when energized to establish predetermined magnetic poles.

A suitable source of direct current energy, for example battery 6, is provided. Switching devices $S_1$, $S_2$, $S_3$, $S_n$ are series connected with windings $W_1$, $W_2$, $W_3$, $W_n$, respectively, through coil 7 across the positive and negative sides of battery 6. Diodes $D_1$, $D_2$, $D_3$, $D_n$ are series connected between each of switching devices $S_1$, $S_2$, $S_3$, $S_n$ and windings $W_1$, $W_2$, $W_3$, $W_n$. Diodes $D_1$, $D_2$, $D_3$, $D_n$ prevent circulating flow of current through windings $W_1$, $W_2$, $W_3$, $W_n$. Control capacitors $C_1$, $C_2$, $C_3$, $C_n$ are interconnected between the junctions of switching devices $S_1$, $S_2$, $S_3$, $S_n$ with their associated diodes $D_1$, $D_2$, $D_3$, $D_n$ respectively.

Switching devices $S_1$, $S_2$, $S_3$, $S_n$ are preferably solid state or semiconductor type switching devices and preferably silicon-controlled rectifiers. Other suitable switching devices such as thyratrons may be contemplated. Switching devices $S_1$, $S_2$, $S_3$, $S_n$, when rendered operative, complete a circuit from the positive terminal of battery 6 through coil 7, diodes $D_1$, $D_2$, $D_3$, $D_n$, and windings $W_1$, $W_2$, $W_3$, $W_n$, respectively, to the negative terminal of battery 6. Current flow through windings $W_1$, $W_2$, $W_3$, $W_n$ is in the direction indicated by the solid line arrow of the drawings.

Operation of switching devices $S_1$, $S_2$, $S_3$, $S_n$ is controlled in response to the position of motor rotor 2 as sensed by a suitable sensing mechanism such as sensor 35. Sensor 35 includes a generally cylindrical disc-like element 36 operably connected to motor rotor 2 for rotation therewith. Disc-like element 36 is comprised of nonmagnetic material such as brass or plastic having magnet 37 secured thereto.

Sensor 35 includes a plurality of generally C-shaped core members 30 formed from a suitable ferromagnetic material and disposed radially about disc 36 in overlapping relationship with the peripheral edges thereof. Windings $L_1$, $L_2$, $L_3$, $L_n$ are disposed on core member 30. Windings $L_1$, $L_2$, $L_3$, $L_n$ are connected across the control and output electrodes of switching devices $S_1$, $S_2$, $S_3$, $S_n$ respectively.

Movement of magnet 37 through each of the C-shaped core members 30 generates a signal pulse in winding $L_1$, $L_2$, $L_3$, $L_n$ which is applied to the control electrode of switching device $S_1$, $S_2$, $S_3$, or $S_n$ respectively to render that switching device operative. Since the amplitude and duration of the signal pulse generated in windings $L_1$, $L_2$, $L_3$, $L_n$ is dependent upon the speed of rotation of motor rotor 2, suitable means (not shown) for selectively operating switching devices $S_1$, $S_2$, $S_3$, $S_n$ in appropriate sequence to start motor 1 from a stand-still may be provided as will be understood by those skilled in the art.

Preferably, a pair of breakdown or Zener diodes 40, 41 are connected back-to-back across each of the signal windings $L_1$, $L_2$, $L_3$, $L_4$. Diodes 40, 41 limit the amplitude of the signal pulse applied to the control electrode of switching devices $S_1$, $S_2$, $S_3$, $S_n$.

With motor rotor 2 rotating in a clockwise direction as shown by the solid line arrow in FIGURE 1 of the drawings and disc-like element 36 of sensor 35 in the position shown, the signal pulse generated in winding $L_1$ on movement of magnet 37 through core member 30 thereof places a positive potential on the control electrode of switching device $S_1$ to render switching device $S_1$ operative. Switching device $S_1$ completes a circuit from battery 6 through coil 7 to energize winding $W_1$. Current flow through winding $W_1$ is in the direction shown by the solid line arrow. Capacitor $C_1$ is charged in the manner shown in the drawings.

As magnet 37 moves clockwise, the signal pulse generated in winding $L_2$ of sensor 35 renders switching device $S_2$ operative. Switching device $S_2$ completes a circuit from the positive terminal of battery 6 through coil 7 and switching device $S_2$ to the negative terminal of battery 6 to energize the winding $W_2$. Operation of switching device $S_2$ connects capacitor $C_1$ across switching device $S_1$. The discharge of capacitor $C_1$ through switching device $S_1$ reduces current flow through switching device $S_1$ to render switching device $S_1$ inoperative.

Clockwise rotation of disc-like element 36 of sensor 35 moves magnet 37 into inductive relationship with windings $L_3$, $L_n$ to sequentially generate signal pulses in the windings $L_3$, $L_n$ and render switching devices $S_3$, $S_n$ operative. The operation of switching device $S_3$ connects winding $W_3$ across battery 6 and discharges capacitor $C_2$ to deenergize switching device $S_2$. The operation of switching device $S_n$ connects winding $W_n$ across battery 6 and discharges capacitor $C_3$ to deenergize switching device $S_3$. As magnet 37 again moves into inductive relationship with winding $L_1$, switching device $S_1$ is rendered operative to energize winding $W_1$ in the manner explained heretofore. Operaton of switching device $S_1$ connects capacitor $C_n$ across the switching device $S_n$ to render switching device $S_n$ inoperative.

While motor 1 of FIGURE 1 is illustrated as having four energizing windings $W_1$, $W_2$, $W_3$, $W_n$, it is understood that the number of windings W may be varied. It is further understood that each of the switching devices $S_1$, $S_2$ $S_3$, $S_n$ may control the energization of more than one winding and further that each of the windings $L_1$, $L_2$, $L_3$, $L_n$ of sensor 35 may regulate operation of more than one switching device.

During operation of the motor 1 where, for example, switching device $S_1$ is operative and winding $W_1$ energized, control capacitor $C_1$ charges in the manner shown in FIGURE 1 through the circuit of switching device $S_1$, diode $D_2$ and winding $W_2$. The movement of motor rotor 2 through the field generated by winding $W_1$ establishes a counter electromotive force, hereinafter designated EMF, in winding $W_1$ opposing battery 6. At the same time there is generated in winding $W_2$ for example an EMF whose polarity may be the same as that of battery 6 and control capacitor $C_1$, series connected with both battery 6 and winding $W_2$ through switching device $S_1$ charges to a voltage approximately double that of battery 6. When switching device $S_2$ is actuated to energize winding $W_2$ and discharge control capacitor $C_1$ to render switching device $S_1$ inoperative as explained heretofore, the surge of current created by the discharge of control capacitor $C_1$ may damage or destroy switching device $S_2$ and/or diode $D_2$.

To limit the voltage on control capacitors $C_1$, $C_2$, $C_3$, $C_n$ a resistor 50 is placed in series with each capacitor $C_1$, $C_2$, $C_3$, $C_n$. A diode 54 is connected in parallel with each resistor 50.

Resistors 50 slow the rate of change of current in the circuits to capacitors $C_1$, $C_2$, $C_3$, $C_n$ to prevent, in the interval during which switching devices $S_1$, $S_2$, $S_3$, $S_n$ are operative, the build-up of an excessive voltage on capacitors $C_1$, $C_2$, $C_3$, $C_n$ respectively. Coil 7, which slows the rate of current build-up in windings $W_1$, $W_2$, $W_3$, $W_n$ upon actuation of switching devices $S_1$, $S_2$, $S_3$, $S_n$, also reduces the rate of current change across control capacitors $C_1$, $C_2$, $C_3$, $C_n$ to further limit the voltage to which the control capacitors can be charged during the interval when switching devices $S_1$, $S_2$, $S_3$, $S_n$ respectively are operative.

Diodes 54 permit the capacitor based turn-off signal to bypass resistors 50.

In the embodiment shown in FIGURE 2 of the drawings, where like numbers refer to like parts, a second resistor 60 is series connected with each of the control capacitors $C_1$, $C_2$, $C_3$, $C_n$. Resistors 60 also slow the rate of current change in the circuits to control capacitors $C_1$, $C_2$, $C_3$, $C_n$. Resistors 60 however are sized to control the discharge rate of control capacitors $C_1$, $C_2$, $C_3$, $C_n$ to assure a sustained reverse potential for the interval necessary to turn-off switching devices $S_1$, $S_2$, $S_3$, $S_n$, it being understood that resistors 50, which are bypassed by diodes 54 when control capacitors $C_1$, $C_2$, $C_3$, $C_n$ discharge, do not affect the rate of current change when the control capacitors discharge. In this embodiment, the series connected resistors 50, 60 are suitably sized to jointly regulate the rate of current change in the control capacitor circuits to when capacitors $C_1$, $C_2$, $C_3$, $C_n$ are charged.

To protect diodes 54 against excessive current at start-up of the motor 1 and at low motor speeds, a circuit (not shown) shorting diodes 54 when motor 1 is started may be provided.

While I have described a preferred embodiment of my invention, it will be understood that my invention is not limited thereto but may be otherwise embodied within the scope of the following claims.

I claim:
1. In a motor having a stator with plural energizing windings and a rotor movable in response to energization of the windings, the combination of first circuit means for energizing one of said windings, said first circuit means including a switching device with a diode series connected between said switching device and said one winding, second circuit means for energizing a second one of said windings, said second circuit means including a switching device with a diode series connected between said switching device and said second winding; means for rendering said first circuit means switching device inoperative to deenergize said one winding including third circuit means connected with said first and second circuit means between said switching devices and said diodes, said third circuit means including a capacitor chargeable upon actuation of said first circuit means switching device, actuation of said second circuit means switching device to energize said second winding discharging the capacitor through said first circuit means switching device to render said first circuit means switching device inoperative and deenergize said one winding; and means controlling the rate of change of current in said third circuit means to limit the charge on said capacitor and prevent execess current surge in said second circuit means upon discharge of said capacitor, said controlling means including resistance means in said third circuit means in series with said capacitor.

2. The motor according to claim 1 in which said controlling means includes a diode for bypassing at least a portion of said resistance means on discharge of said capacitor.

3. The motor according to claim 1 in which said resistance means includes first and second series connected resistors; and diode means effective on discharge of said capacitor to bypass said first resistor.

4. The motor according to claim 1 in which said controlling means includes inductance means in series with each of said first and second circuit means.

References Cited

UNITED STATES PATENTS 3,364,408  1/1968  Katz et al.  318—227 XR

ORIS L. RADER, Primary Examiner

G. Z. RUBINSON, Assistant Examiner

U.S. Cl. X.R.

318—227; 321—45